United States Patent [19]

de Villepoix et al.

[11] Patent Number: 4,561,662
[45] Date of Patent: Dec. 31, 1985

[54] FLEXIBLE METAL SEALING JOINT INCORPORATING EXPENDABLE PROJECTING PORTIONS

[75] Inventors: Raymond de Villepoix, Donzere; Jean Fages, Pierrelatte; Robert Forges, Bollene; Claude Abbes, Saint Etienne; Christian Rouaud, Bourg Saint Andeol, all of France

[73] Assignee: Commissariat a l'Energie Atomique, Paris, France

[21] Appl. No.: 685,901

[22] Filed: Dec. 24, 1984

[30] Foreign Application Priority Data

Dec. 29, 1983 [FR] France ................................. 83 21019

[51] Int. Cl.⁴ .............................................. F16J 15/08
[52] U.S. Cl. ................................ 277/229; 277/235 A; 277/236; 277/205
[58] Field of Search ............... 277/212 C, 205, 227, 277/229, 233, 234, 235 R, 235 A, 236

[56] References Cited

U.S. PATENT DOCUMENTS

| | | | |
|---|---|---|---|
| 3,188,100 | 6/1965 | Delgado | 277/205 |
| 3,313,553 | 4/1967 | Gastineau | 277/236 X |
| 3,820,799 | 6/1974 | Abbes et al. | 277/236 X |
| 3,917,294 | 11/1975 | Abbes et al. | 277/236 X |
| 4,261,584 | 4/1981 | Browne et al. | 277/235 R |

FOREIGN PATENT DOCUMENTS

| | | | |
|---|---|---|---|
| 2300269 | 9/1976 | France | |
| 627220 | 8/1949 | United Kingdom | 277/236 |
| 990438 | 4/1965 | United Kingdom | 277/236 |
| 1212767 | 11/1970 | United Kingdom | 277/235 R |

OTHER PUBLICATIONS

"Beruhrungsdichtungen" an Ruhenden und Bewegten Machinenteilen Konstruktionsbucher Herausgegeben von Professor Dr.-Ing K. Kollman Band 17, Nov. 1975.

*Primary Examiner*—Robert S. Ward
*Attorney, Agent, or Firm*—Oblon, Fisher, Spivak, McClelland & Maier

[57] ABSTRACT

A flexible metal sealing joint comprising an elastic metal core which, in the rest position, is shaped like a torus, as well as at least one outer envelope made from a ductile material. Within its thickness, the outer envelope has two substantially planar bearing surfaces and at least one projecting portion with a substantially triangular cross-section formed on each of the bearing surfaces. The dimensions of the projecting portions are such that said portions are expendable, i.e. they disappear at the end of fixing.

4 Claims, 5 Drawing Figures

FLEXIBLE METAL SEALING JOINT INCORPORATING EXPENDABLE PROJECTING PORTIONS

BACKGROUND OF THE INVENTION

The present invention relates to a flexible metal sealing joint or gasket having expendable projecting portions making it possible to rapidly obtain a good sealing action for a limited clamping or tightening force.

More specifically, the present invention relates to a flexible metal sealing joint of the type having at least one elastic metal core which, in the rest position, is shaped like a torus and at least one outer envelope made from a ductile material, in which is inserted said metal core.

It is pointed out that the invention can be used in all joints of this type and independently of the shape thereof (rectangular, circular, oblong, triangular, oval, etc.). In addition, it relates to joints having one sealing line and to those having two sealing lines.

In existing metal joints, the toroidal elastic core is constituted either by a metal tube, or by a helical spring having contiguous turns and closed on itself. In the latter case, the section of the wire constituting the spring can be of a random nature and is in particular circular, rectangular or circular segmental. The tube or the helical spring, fixed to the edge, imparts the elasticity to the joint.

Moreover, the envelope or envelopes surrounding the core of existing joints are made from plated materials or thin sheets, of e.g. polytetrafluoroethylene, aluminium, silver, copper, nickel, tantalum, stainless steel, zirconium, etc.

When the joints comprise several envelopes, each of the latter has a special function. Thus, when the core of the joint is constituted by a spring having contiguous turns, the inner envelope generally has a load distribution function at each apex of the turn of the elastic core. The outer envelope is made from a ductile material which, due to its creep capacity in contacting surface roughnesses, makes it possible to give the joint a perfect seal when fixed in an assembly. In general terms, the envelopes of the joint are characterized by the plastic properties of the materials forming them.

For further details regarding the structure of a metal sealing joint, whose core is constituted by a helical spring having contiguous turns, reference should be made to French Patent No. 73 19488 of May 29th 1973 in the name of the Commissariat a l'Energie Atomique.

Industrial experience has shown that the elastic metal joints make it possible to obtain a particularly good static sealing action and in particular an excellent thermal behaviour.

In addition, static metal joints are known, which have a solid part, e.g. of aluminium or copper, whose bearing faces are provided with one or more projecting portions having a triangular or circular arc-shaped cross-section. In joints of this type, so-called solid knife-edge joints, the reduction of the surfaces of the joint in contact with the facing portion of the assembly makes it possible to reduce the tightening or clamping force necessary for obtaining the desired seal. However, these joints suffer from the disadvantage of being very sensitive to thermal creep, so that the reliability of the seal is not ensured.

SUMMARY OF THE INVENTION

The present invention relates to a flexible metal sealing joint, combining the advantages of existing flexible metal joints and of solid knife-edge joints, without suffering from the disadvantages thereof.

The invention therefore relates to a flexible metal sealing joint of the aforementioned type, wherein the outer envelope is provided over its entire periphery with two substantially planar, opposite bearing surfaces and at least one projecting portion having a substantially triangular cross-section formed on each of the bearing surfaces, the dimensions of the projecting portions being such that they disappear completely as a result of the fixing of the joint.

According to a preferred embodiment of the invention, the bearing surfaces and the projecting portions are made in the thickness of the outer envelope. Thus, these portions can be obtained either by a known machining process by removing material, such as turning, milling, grinding and knurling, or by a process such as die forging without any material removal.

Preferably, the angle formed in section by each of the projecting portions is between 90° and 110°.

Obviously, one or more projecting portions can be formed on each of the bearing surfaces, these projecting portions being arranged symmetrically with respect to the plane of symmetry of the joint.

BRIEF DESCRIPTION OF THE DRAWINGS

The invention is described in greater detail hereinafter relative to a preferred embodiment of the invention and with reference to the attached drawings, wherein show.

DETAILED DESCRIPTION OF THE INVENTION

Figure 1:
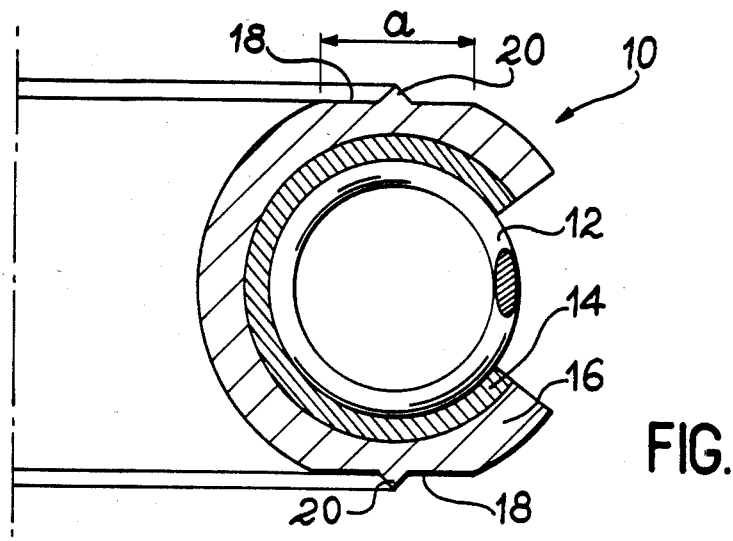
FIG. 1 in cross-section, part of a flexible metal joint according to the invention.

FIG. 1 shows the different parts of a flexible metal sealing joint, whose elastic core is constituted by a helical spring having contiguous turns in accordance with the prior art. Thus, the joint 10 shown in FIG. 1 comprises a core constituted by a helical metal spring 12 having contiguous turns and closed on itself. Spring 12 is inserted in a first envelope 14, which is itself inserted in an outer envelope 16. In a conventional manner, each of the envelopes 14, 16 is open along one of the peripheries of the spring 12 constituting the core of joint 10. The functions of each of the envelopes 14, 16 as well as the nature of the materials forming them remain identical to those of the prior art flexible metal joints and will not be described again.

According to the invention, substantially planar bearing surfaces 18, which are parallel to one another and to the plane of symmetry of joint 10 are formed on either side thereof, so that they can bear, after fixing, against the corresponding parts of an assembly, as will be shown hereinafter.

Figure 3:
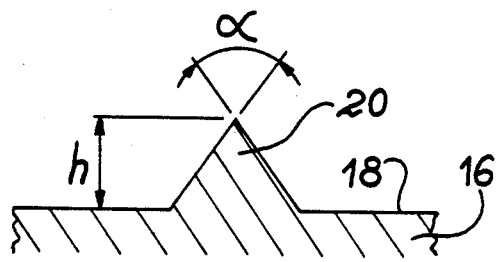
FIG. 3 a larger scale view showing the cross-section through one of the projecting portions of the joint of FIG. 1.

According to an essential feature of the invention, each of the bearing surfaces 18 has over its entire periphery at least one expendable projecting portion 20. As illustrated in FIG. 3, each of the said projecting portions 20 has a triangular or substantially triangular section, whose apex angle $\alpha$ is preferably between 90° and 110°. Height h of the projecting portions is relatively small compared with the dimensions of the joint, so that these expendable portions disappear completely at the end of fixing. For example, the height h can be between 0.1 and 0.2 mm if the outer envelope 16 has a thickness of approximately 0.3 to 0.5 mm outside of the bearing surfaces 18.

Preferably the projecting portions 20 are arranged symmetrically with respect to the plane of symmetry of joint 10. More specifically, the projecting portions 20 are diametrically opposite with respect to the centre of the circles defined in sections by the different elements constituting joint 10.

Thus, when each of the bearing surfaces 18 has a single projecting portion 20, as in the embodiment of FIG. 1, said portions 20 are located in the centre of bearing surfaces 18. When two or three projecting portions are formed on each of the bearing surfaces 18, said projecting portions are distributed symmetrically with respect to the median line of the segment formed by the bearing surface 18 in the cross-section of the joint of FIG. 1.

In the case where several projecting portions are formed on each bearing surface, they all have the same height h. When the said projecting portions are juxtaposed over the entire length a of each bearing surface, the latter is materialized by the plane joining the base of the projecting portions.

Preferably and as shown in FIG. 1, bearing surfaces 18 and the projecting portions 20 are formed in the thickness of the outer envelope 16. In order to arrive at this result, it is either possible to carry out machining by removing the material, or shaping without removing material. In the first case, different known machining processes can be used, such as turning, milling, grinding or knurling. In the second case, use can be made of die forging.

The latter process is particularly advantageous, because it makes it possible to produce large batches rapidly, economically and with a good reproducibility with respect to the formation of the projecting portions. Moreover, the obtaining of bearing surfaces 18 and projecting portions 20 by die forging is applicable to all types of joints no matter what their shape (circular or non-circular) and both to joints having one sealing line and to those having two sealing lines.

Figure 2:
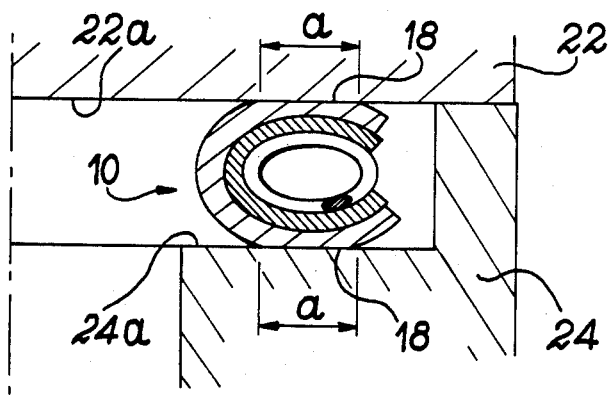
FIG. 2 also in cross-section, the joint of FIG. 1 at the end of the fixing in an assembly.

FIG. 2 shows the joint according to the invention in the manner described hereinbefore relative to FIG. 1, locked between the facing surfaces 22a, 24a of the two portions 22, 24 of an assembly. Bearing in mind the small dimensions of the projecting portions 20 and the ductile nature of the material forming the outer envelope 16, said portions 20 disappear completely at the end of fixing. Surfaces 22a, 24a then bear against bearing surfaces 18.

Thus, during the fixing or locking of the joint expendable projecting portions 20 make it possible to rapidly obtain a very good seal for a small force comparable to that of solid knife-edge joints according to the prior art. However, at the end of locking, the transmission of the force takes place of the entire width a of each of the bearing surfaces 18, in the same way as if it were a conventional flexible metal joint. This bearing width a between joint 10 and surfaces 22a, 24a is favourable to a stabilization of the thermal creep of the outer envelope 16.

Figure 5:
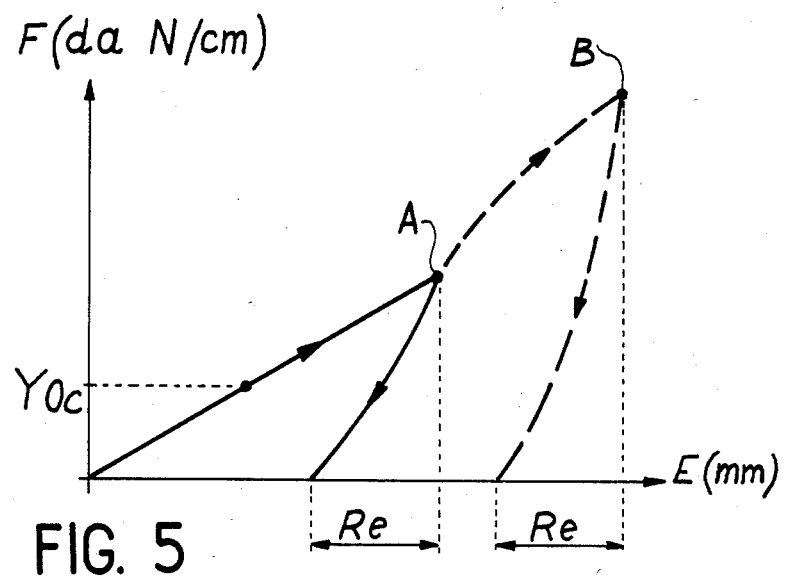
FIG. 5 the characteristic curve of a flexible metal joint according to the invention, like that of FIG. 1.
Figure 4:
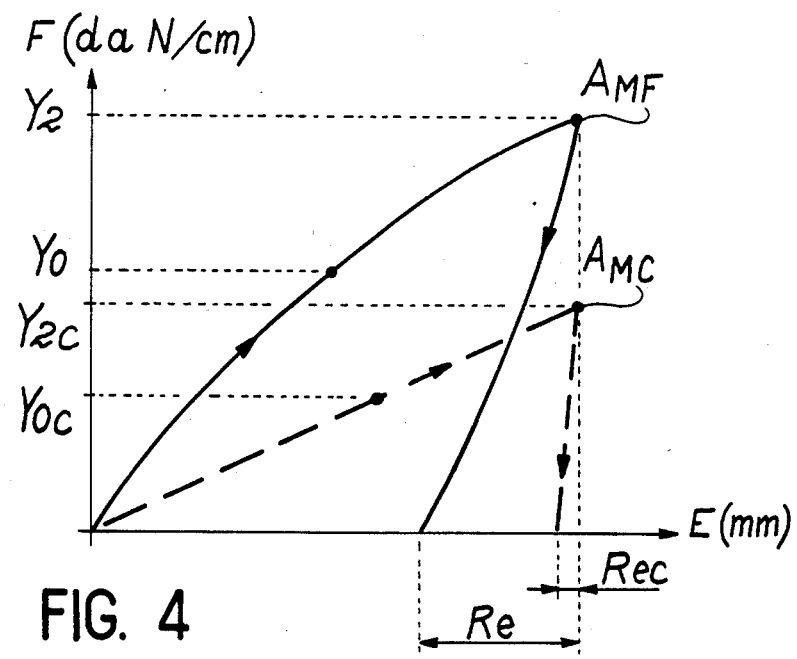
FIG. 4 characteristic curves of the variation of the clamping force F (in daN/cm) as a function of the compression or crushing E (in mm), for a flexible metal joint according to the prior art (in continuous line form) and for a comparable prior art solid knife-edge joint (in broken line form).

To give a better understanding of the significance of the flexible metal joint with projecting portions according to the invention, reference should now be made to FIGS. 4 and 5, which respectively show in the case of FIG. 4 the characteristic curves of a prior art flexible metal joint (in continuous line form) and a comparable prior art solid knife-edge joint (in broken line form) and in the case of FIG. 5 the characteristic curve of a flexible metal joint with projecting portions, constructed according to the invention. The comparison of these curves illustrates the respective advantages and disadvantages of each solution.

Thus, it can be seen in FIG. 4 that for a conventional flexible metal joint and a solid knife-edge joint, whose respective operating points $A_{MF}$ and $A_{MC}$ are obtained for a same compression value E, the clamping force F which has to be applied to the joint to arrive at the operating point is substantially doubled in the case of a conventional flexible metal joint (force $Y_2$) compared with the solid knife-edge joint (force $Y_{2c}$). The same remark applies with respect to the forces $Y_0$ and $Y_{0c}$ necessary in the two cases in order to obtain the necessary sealing of the assembly.

FIG. 4 also shows that the elastic recovery $R_{ec}$ of a solid knife-edge joint is substantially negligible compared with the elastic recovery $R_e$ of a conventional flexible metal joint. As stated hereinbefore, in the case of the latter, there is a very considerable thermal creep stability of the ductile covering, which is not the case with a solid knife-edge joint.

On referring now to FIG. 5, showing the characteristic curve of a flexible metal joint with expendable triangular projecting portions according to the invention, the start of the compression curve is similar to the start of the curve of the prior art solid knife-edge joint. In particular, for a comparable joint, the sealing threshold $Y_{0c}$ is the same as that of the solid knife-edge joint in FIG. 4. In other words, the tightening or locking force necessary for obtaining the seal and which makes it possible to arrive at the operating point A is greatly reduced compared with the prior art flexible metal joint.

On continuing the compression of the joint, the projecting portions progressively disappear and the bearing surfaces of the joint come into contact with the facing surfaces formed on the corresponding portions of the assembly. This situation corresponds to point A in FIG. 5, which defines the operating point of the sealing joint or gasket according to the invention. The characteristic curve of the joint according to the invention corresponding to the operating point A is shown in continuous line form in FIG. 5.

If the locking force was still further increased, there would be a change from point A to point B by following the curve shown in broken line form in FIG. 5, which corresponds to the characteristics of a flexible metal joint according to the prior art. Force increase is of no interest in the case of the joint according to the invention. Thus, as can be seen in FIG. 5, the elastic recovery $R_e$ is substantially the same when the joint is used at point A and when it is used at point B. It should be noted that this elastic recovery $R_e$ is substantially identical to the elastic recovery of a conventional flexible metal joint, so that the joint according to the invention, like the latter, has a much better thermal behaviour than that of a solid knife-edge joint.

Furthermore and as has been stated at a number of points during the description, the invention is not limited to the embodiments described in exemplified manner hereinbefore and in fact covers all variants thereof. Thus, it has been seen that the invention can apply both to circular joints and to non-circular joints, and that it is independent of the number of sealing lines of the joint. In addition, the invention is applicable both to joints whose metal core is constituted by a tube and to joints whose core is constituted by a helical spring with contiguous turns. In the same way, the invention can be used both in the case of a joint having a single ductile metal envelope and in the case of a joint having several envelopes surrounding the metal core. Moreover, the number of projecting portions formed on each of the bearing surfaces can be of a random nature and, although preferably these are formed in the thickness of the outer envelope of the joint, they could also be obtained in the form of a reinforcement on the joint without passing beyond the scope of the invention.

What is claimed is:

1. A flexible metal sealing joint comprising at least one elastic metal core which, in the rest position, is shaped like a torus, as well as at least one outer envelope made from a ductile material in which is inserted the metal core, wherein the outer envelope is provided over its entire periphery with two substantially planar opposite bearing surfaces and at least one projecting portion having a substantially triangular cross-section formed on each of the bearing surfaces, the dimensions of the projecting portions being such that these portions disappear entirely under the locking or tightening effect of the joint.

2. A joint according to claim 1, wherein the bearing surfaces and the projecting portions are formed in the thickness of the outer envelope.

3. A joint according to claim 1, wherein the angle formed in section for each of the projecting portions between 90° and 110°.

4. A joint according to claim 1, wherein the projecting portions are arranged symmetrically with respect to the plane of symmetry of the joint.

* * * * *